(12) United States Patent
Byrne

(10) Patent No.: US 12,536,847 B2
(45) Date of Patent: Jan. 27, 2026

(54) SYSTEMS AND METHODS FOR LOGGING VEHICLE DATA

(71) Applicant: Ford Global Technologies, LLC, Dearborn, MI (US)

(72) Inventor: Brendan Byrne, Detroit, MI (US)

( * ) Notice: Subject to any disclaimer, the term of this patent is extended or adjusted under 35 U.S.C. 154(b) by 206 days.

(21) Appl. No.: 18/416,750

(22) Filed: Jan. 18, 2024

(65) Prior Publication Data

US 2025/0239107 A1  Jul. 24, 2025

(51) Int. Cl.
*G07C 5/00* (2006.01)
*G07C 5/08* (2006.01)

(52) U.S. Cl.
CPC ............. *G07C 5/008* (2013.01); *G07C 5/085* (2013.01)

(58) Field of Classification Search
CPC ................................ G07C 5/008; G07C 5/085
See application file for complete search history.

(56) References Cited

U.S. PATENT DOCUMENTS

2017/0161282 A1  6/2017  Kemme et al.
2021/0226973 A1  7/2021  Hirano et al.

FOREIGN PATENT DOCUMENTS

WO  2017178902 A1  10/2017
WO  2022075076 A1  4/2022

OTHER PUBLICATIONS

Garrett Forensics, Accident Reconstruction & Vehicle Data Downloads, garrettforensics.com, 2023, pp. 1-6.
Miyuru Dayarathna, et al., DEMO: Solution Recommender for System Failure Recovery via Log Event Pattern Matching on a Knowledge Graph, DOI: 10.1145/3093742.3095094, Jun. 19-23, 2017, pp. 331-334.

*Primary Examiner* — Thomas S Mccormack
(74) *Attorney, Agent, or Firm* — Joseph Zane; Eversheds Sutherland (US) LLP

(57) ABSTRACT

A method for logging vehicle data is disclosed. The method may include obtaining a trigger signal and generating a keyframe associated with the vehicle data responsive to obtaining the trigger signal. The keyframe may include a plurality of node states associated with a plurality of nodes, and the plurality of nodes is associated with a plurality of vehicle programs that may be in causal relationship. The generation of the keyframe may include obtaining and storing a primary message in a keyframe buffer, and causing the plurality of vehicle programs to store states of respective node states serially and sequentially in the keyframe buffer to generate the keyframe. The method may further include detecting an event associated with the vehicle, and logging the keyframe buffer in a server responsive to detecting the event.

20 Claims, 4 Drawing Sheets

SYSTEMS AND METHODS FOR LOGGING VEHICLE DATA

FIELD

The present disclosure relates to systems and methods for logging vehicle data in a server.

BACKGROUND

A vehicle uses a plurality of features to aid a vehicle user in driving the vehicle. The plurality of features may use vehicle sensors and computers, which may generate a substantial amount of data. Typically, the data generated by the vehicle sensors/computers is stored on a server or in memory for analysis (e.g., at a later stage). Since the data size may be very large, the data may consume a lot of storage space on the server. In addition, transmission of such large-sized data from the vehicle to the server may require additional communication resources.

Typically, all the data is not utilized or required for analysis, and hence storing the entire data may not be necessary.

BRIEF DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
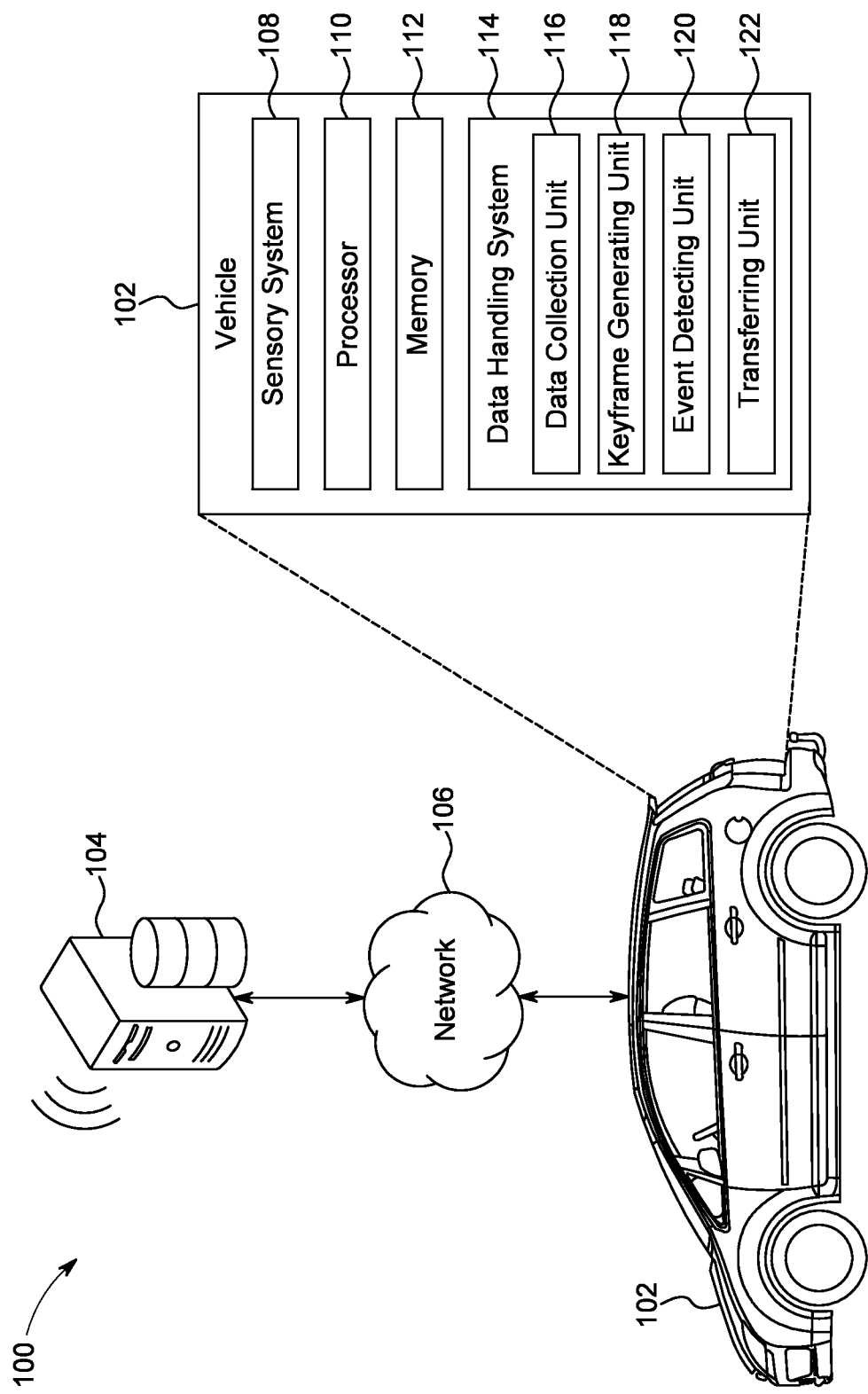
FIG. 1 depicts an example system for logging vehicle data in accordance with the present disclosure.

The present disclosure describes a system and method to log data on the vehicle, and to minimize utilization of resources in collecting the data on vehicle, and transmitting and storing the vehicle data on the server. The system may identify/select information that may be required to reconstruct the vehicle data at a later stage, and may store the selected information. Thus, the vehicle may not store all the information, and may store only that information that may be required at a later stage for reconstruction. In some aspects, the system may log the selected information on the server when an event occurs on the vehicle. For example, the system may monitor the vehicle data (including data from vehicle sensors), and may detect occurrence of the event based on the monitoring. When the event occurs, the system may transmit the selected data (associated with the event or captured at the time of the event) to the server, which enables the server to reconstruct the vehicle data around the event. In this manner, the system minimizes the space utilization and resources to transmit data from the vehicle to the server.

In some aspects, the system may be configured to generate keyframes associated with the vehicle data. The keyframe may include the states of nodes associated with a communications graph (e.g., a directed graph). Each node may be associated with a vehicle program. Thus, the keyframe may include states of vehicle programs that may be connected in a causal relationship (or connected in series). In some aspects, the system may store the states sequentially and serially in a keyframe buffer to generate the keyframe, and may not store the states simultaneously.

The nodes may be connected via channels that may be configured to move or propagate information from one node to another. In some aspects, a first node may be configured to receive a primary message. When the first node receives the primary message, the vehicle program associated with the first node loads a first node state in the keyframe buffer, and may publish a first message. The first message may move from the first node to a second node via a first channel. The second node may receive the first message, store a second node state in the keyframe buffer, and then publish a second message via a second channel. In this manner, the system stores the node states sequentially and serially. In addition to the states, the system will store the primary message and potentially one or more pieces of additional information. The additional information may include information associated with the flow of data in the directed graph. The states, the primary message, and the additional information may be utilized by the server to reconstruct the vehicle data at a later stage.

By leveraging the causal relationship between the vehicle programs and controlling how the vehicle programs save their data, there may be an overall reduction in the amount of data that needs to be saved on the vehicle as well as the server. In addition, the storage of states, the primary message, and the additional information allows the server to accurately reconstruct the missing information.

These and other advantages of the present disclosure are provided in detail herein.

Illustrative Embodiments

The disclosure will be described more fully hereinafter with reference to the accompanying drawings, in which example embodiments of the disclosure are shown, and not intended to be limiting.

FIG. 1 depicts an example system 100 for logging vehicle data in accordance with the present disclosure. While describing FIG. 1, references will be made to FIGS. 2 and 3.

The system 100 may include a vehicle 102 and a server 104, which may be communicatively coupled with each other via a network 106. The vehicle 102 may take the form of any personal or commercial vehicle, a car, a work vehicle, a crossover vehicle, a truck, a van, a minivan, etc. Further, the vehicle 102 may be a manually driven vehicle, and/or may be configured to operate in a fully autonomous (e.g., driverless) mode or a partially autonomous mode, and may include any powertrain such as, for example, a gasoline engine, one or more electrically-actuated motor(s), a hybrid system, etc. In some aspects, the server 104 may be configured to log or store vehicle data, and to perform analysis on the stored vehicle data. Further server details are described in detail below in conjunction with FIG. 3.

The network 106 illustrates an example of communication infrastructure in which the connected devices discussed in various embodiments of this disclosure may communicate. The network 106 may be and/or include the Internet, a private network, public network or other configuration that operates using any one or more known communication protocols such as, for example, transmission control protocol/Internet protocol (TCP/IP), Bluetooth®, Bluetooth® Low Energy (BLE), Wi-Fi based on the Institute of Electrical and Electronics Engineers (IEEE) standard 802.11, ultra-wideband (UWB), and cellular technologies such as Time Division Multiple Access (TDMA), Code Division Multiple Access (CDMA), High-Speed Packet Access (HSPDA), Long-Term Evolution (LTE), Global System for Mobile Communications (GSM), and Fifth Generation (5G), to name a few examples.

The vehicle 102 may include a plurality of components including, but not limited to, a sensory system 108, a processor 110, a memory 112, and a data handling system 114, which may be communicatively coupled to each other. The data handling system 114 may include a plurality of units including, but not limited to, a data collection unit 116, a keyframe generating unit 118, an event detecting unit 120, a transferring unit 122, and/or the like, which may be communicatively coupled to each other.

The sensory system 108 may include a plurality of sensors including, but not limited to, a vehicle wheel speed sensor, a Radio Detection and Ranging (RADAR or "radar") sensor configured for detection and localization of objects inside and outside the vehicle 102 using radio waves, sitting area buckle sensors, sitting area sensors, a Light Detecting and Ranging ("lidar") sensor, door sensors, proximity sensors, temperature sensors, one or more ambient weather or temperature sensors, vehicle interior and exterior cameras, steering wheel sensors, a vehicle accelerometer, a vehicle gyroscope, a vehicle magnetometer, etc. The sensory system 108 may be configured to measure a plurality of inputs associated with a plurality of vehicle components at a predefined frequency.

The processor 110 may be disposed in communication with one or more memory devices disposed in communication with the respective computing systems (e.g., the memory 112 and other databases not shown in FIG. 1). The processor 110 may utilize the memory 112 to store vehicle programs in code and/or to store data for performing aspects in accordance with the disclosure. In some aspects, the vehicle programs may be configured to enable vehicle operation based on the plurality of inputs obtained from the sensory system 108. The memory 112 may be a non-transitory computer-readable storage medium or memory storing a vehicle data handling program code. The memory 112 may include any one or a combination of volatile memory elements (e.g., dynamic random-access memory (DRAM), synchronous dynamic random-access memory (SDRAM), etc.) and may include any one or more nonvolatile memory elements (e.g., erasable programmable read-only memory (EPROM), flash memory, electronically erasable programmable read-only memory (EEPROM), programmable read-only memory (PROM), etc.).

The data handling system 114 may be a processing unit configured to manage vehicle data generated by the sensory system 108 and/or the vehicle programs. In an exemplary aspect, the data handling system 114 may be configured to store the vehicle data in a controlled manner (as described below), identify/select a subset of vehicle data associated with an event (responsive to detecting the event), and transfer the subset of vehicle data to the server 104 via the network 106. The event, as described herein, may be any event associated with the vehicle 102 that may be of interest to a vehicle operator or any other entity, e.g., a sudden drop in vehicle speed due to an obstruction identification in proximity to the vehicle 102, detection of a faulty vehicle component, and/or the like. By transferring only a subset of vehicle data (and not the entire vehicle data) to the server 104, the data handling system 114 may log or store selective data associated with the event (e.g., when the event occurs), and may not store all the vehicle data in the server 104, thereby minimizing utilization of resources required to transmit the data to the server 104 and/or server storage space.

In some aspects, the data handling system 114 may utilize the data collection unit 116 to collect data (e.g., vehicle data) generated by the vehicle 102. In an exemplary aspect, the data collection unit 116 may collect the vehicle data from the sensory system 108 and the vehicle programs, at a predefined frequency or when the data collection unit 116 transmits a request to the sensory system 108 and/or the vehicle programs to obtain the vehicle data.

Further, the data handling system 114 may utilize the keyframe generating unit 118 to generate keyframes associated with the vehicle data collected by the data collection unit 116. The keyframe generating unit 118 may generate a keyframe responsive to obtaining a trigger signal. In some aspects, the trigger signal may be generated by a vehicle/system timer (not shown) at a predefined frequency, and the keyframe generating unit 118 may obtain the trigger signal from the timer. In other aspects, the trigger signal may be generated by one or more sensors of the sensory system 108, and the keyframe generating unit 118 may obtain the trigger signal from the sensor(s). The keyframe generating unit 118 may obtain the trigger signal from the timer and/or the sensor(s), and then generate the keyframe responsive to obtaining the trigger signal.

Figure 2:
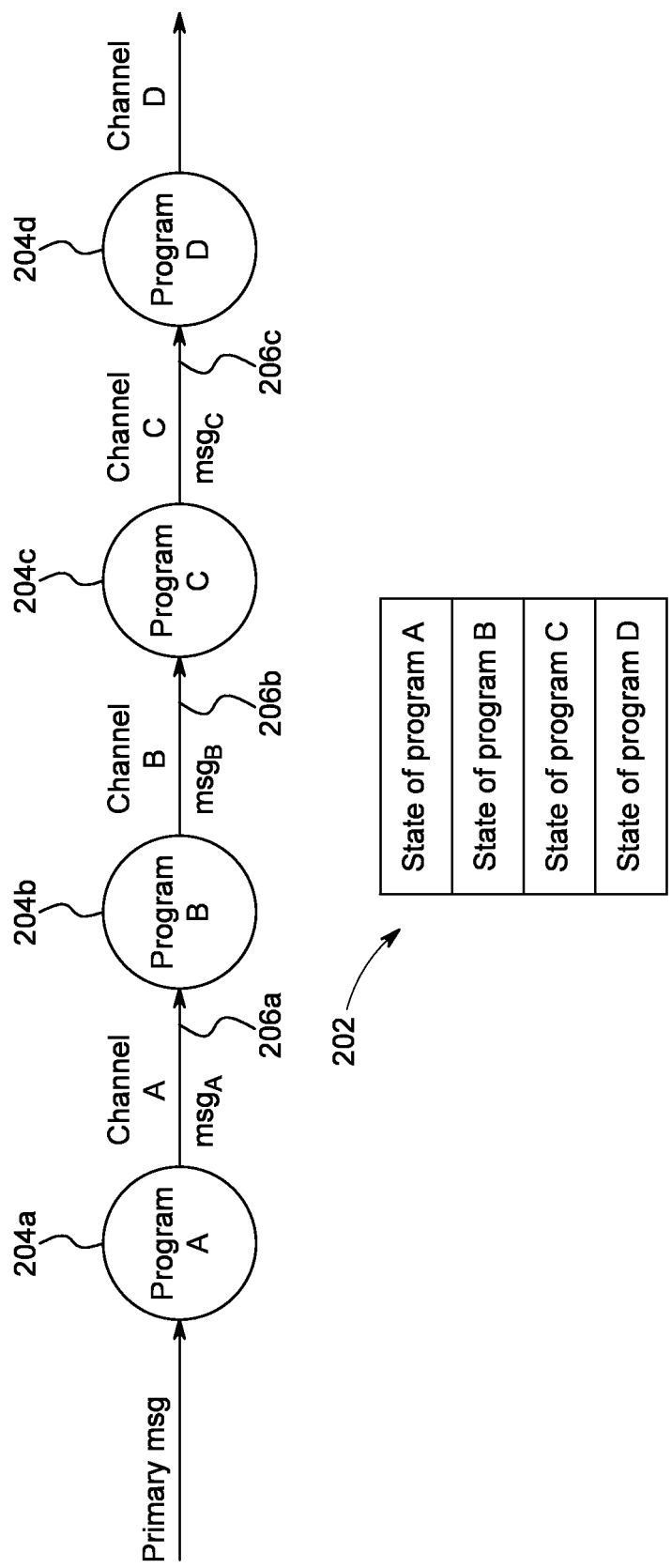
FIG. 2 depicts an example system to generate a keyframe in accordance with the present disclosure.

In some aspects, the keyframe may include a plurality of nodes states associated with a plurality of nodes connected serially, which may be a part of a communications graph (e.g., a directed graph). The plurality of nodes states may be included in a keyframe buffer 202 (as shown in FIG. 2), which may be loaded serially and sequentially in the keyframe buffer 202 (as explained below). In some aspects, the keyframe buffer 202 may be a circular buffer, which allows the keyframe buffer 202 to constantly record node states, and replace old node states with new node states as and when the new node states become available. The keyframe buffer 202 may also replace the old node states with the new node states at a predefined frequency (e.g., after every predefined count of seconds, or when the old node states expire).

In an exemplary aspect, the plurality of nodes may include a first node 204a, a second node 204b, a third node 204c, a fourth node 204d, and so on (collectively referred to as nodes 204), which may be a part of a directed graph.

In some aspects, the plurality of nodes 204 may be associated with a plurality of vehicle programs. In an exemplary aspect, each node may be associated with one vehicle program. For example, the first node 204a may be associated with a "Program A", the second node 204b may be associated with a "Program B", the third node 204c may be associated with a "Program C", the fourth node 204d may be associated with a "Program D", and so on. In some aspects, the plurality of vehicle programs may be connected in a causal relationship. Stated another way, the plurality of nodes 204 may be connected serially. For example, the output of "Program A" may be received by "Program B", and the output of "Program B" may be based on the output of "Program A", and so on.

Since the nodes 204 are associated with vehicle programs, the keyframe may include a plurality of vehicle program states (as "node states") logged in the keyframe buffer 202. The node state/vehicle program state may include a collection of values at a particular moment, and may include information that may be used to reconstruct vehicle data by the server 104. For example, when a node is reinitialized with a state object and given the same inputs, the node may produce the same behavior. A unique identifier may be generated each time a program's state is modified, and the unique identifier may be associated with said state (e.g., at the end of any function call). This allows the data handling system 114 to identify state(s) that need to be loaded before starting their execution (e.g., logging).

In some aspects, the nodes 204 may be connected via channels, which may be unidirectional channels. A channel may be a connection between two or more vehicle programs. Stated another way, the vehicle programs may communicate with each other via the channel connected between them. For example, the first node 204a and the second node 204b may be connected via a first channel 206a, the second node 204b and the third node 204c may be connected via a second channel 206b, the third node 204c and the fourth node 204d may be connected via a third channel 206c, and so on. The first channel 206a, the second channel 206b, and the third channel 206c are collectively referred to as channels 206 in the present disclosure. In some aspects, the vehicle data may flow serially and sequentially (and not simultaneously) in a forward direction in the nodes 204, via the channels 206.

In some aspects, the vehicle programs associated with the nodes 204 may be configured to publish messages via the channels 206, as the vehicle data serially flows through the nodes 204. For example, the first vehicle program associated with the first node 204a may publish a message "A" or "$msg_A$" via the first channel 206a, when the vehicle data flows through the first node 204a. In some aspects, the message "A" or "$msg_A$" may be based on a first node state (or a first vehicle program state) and a "primary message" obtained by the first vehicle program. In some aspects, the primary message may be associated with the sensor data generated by the sensory system 108. Responsive to the first vehicle program publishing the message "$msg_A$", the second vehicle program associated with the second node 204b may receive the message "$msg_A$" and publish a message "$msg_B$" via the second channel 206b. In some aspects, the message "$msg_B$" may be based on a second node state (or a second vehicle program state) and the message "$msg_A$". Similarly, the third vehicle program associated with the third node 204c may publish a message "C" or "$msg_C$" via the third channel 206c, based on a third node state (or a third vehicle program state) and the message "$msg_B$", and so on.

In operation, the keyframe generating unit 118 may obtain the trigger signal (e.g., from the vehicle/system timer and/or one or more sensors of the sensory system 108) and initiate generation of the keyframe. The keyframe generating unit 118 may further obtain the primary message at the first node 204a. Responsive to obtaining the primary message, the keyframe generating unit 118 may store the primary message, for example, in the keyframe buffer 202. In some aspects, when the keyframe generating unit 118 receives the primary message, a "wave" of data starts from the first node 204a and may flow towards the other nodes (from the plurality of nodes 204) serially or sequentially. In some aspects, the primary message may be received at a node located at a beginning of the directed graph, i.e., at the first node 204a.

In further aspects, responsive to obtaining the primary message, the keyframe generating unit 118 may cause the vehicle programs associated with the nodes 204 to store respective node states serially and sequentially in the keyframe buffer 202 to generate the keyframe. Specifically, the keyframe generating unit 118 may cause the first vehicle program (e.g., the program A) associated with the first node 204a to load/store a first node state (associated with the first node 204a) in the keyframe buffer 202, when the first vehicle program receives the primary message. In some aspects, the first node state may be based on the primary message, and is shown as "State of Program A" in FIG. 2.

In some aspects, the first vehicle program may publish the first message (or the message "$msg_A$"), via the first channel 206A, when the first node 204a receives the primary message. The first vehicle program may publish the first message responsive to storing first node state or while storing the first node state. In some aspects, the first message may be based on the primary message and the first node state. The first message may be configured to move/propagate from the first node 204a to the second node 204b.

In some aspects, when the second node 204b receives the first message, the keyframe generating unit 118 may cause the second vehicle program (e.g., the Program B) associated with the second node 204b to load/store the second node state (shown as "State of Program B" in FIG. 2) in the keyframe buffer 202. In some aspects, the second vehicle program may publish the second message (or the message "$msg_B$"), via the second channel 206b, when the second node 204b receives the first message. The second vehicle program may publish the second message responsive to storing the second node state or while storing the second node state. In some aspects, the second message may be based on the first message and the second node state. The second message may be configured to move/propagate from the second node 204b to the third node 204c, and the process continues until the keyframe buffer 202 stores states of all vehicle programs/nodes (e.g., in the exemplary aspect depicted in FIG. 2, when the states of Programs C and D are stored in the keyframe buffer 202).

In this manner, the keyframe generating unit 118 may store states of all vehicle programs/nodes 204 and the primary message. In some aspects, the keyframe generating unit 118 may not store the messages published by the vehicle programs/nodes 204, e.g., the first message ("$msg_A$"), the second message ("$msg_B$"), etc. in the keyframe buffer 202, which may enable to minimize utilization of storage resources. Specifically, the keyframe generating unit 118 may not store the first message, the second message etc. as these messages may efficiently be restored/reconstructed based on the stored vehicle program states/node states and the primary message. The process of reconstruction is described in detail later in the described below.

In further aspects, the keyframe generating unit 118 may be configured to collect additional information associated with the vehicle 102, and store the additional information in the keyframe buffer 202. The additional information may be associated with the flow of data (e.g., vehicle data) around the vehicle's onboard system(s). The additional information may be required by the server 104 to reconstruct the vehicle data based on the information stored in the keyframe buffer 202. In some aspects, the additional information may include information about when and how a node function was run/executed, information associated with effects of running the node function, and/or the like. For example, the additional information may include, but is not limited to, a timestamp associated with the function run, a node function identification (ID), a current time or function run start time, a random number generator (RNG) seed, a sequence number of the node's state right before the function was run, a list of effects caused by function, and/or the like. In an exemplary aspect, the effects of running the node function may include, but are not limited to, publishing a message, mutating node state, and/or the like.

In further aspects, the event detecting unit 120 may be configured to detect an event associated with the vehicle 102. The event may include any scenario that happens on the vehicle 102, which needs further investigation such as an adverse situation. In some aspects, the event detecting unit 120 may monitor the vehicle data (including the vehicle sensor data output from the sensory system 108), and may detect the event based on the monitoring. Responsive to detecting the event, the event detecting unit 120 may transmit an event notification to the transferring unit 122 (and/or other vehicle units). In some aspects, the event notification may include information associated with the event and/or the event detection.

The transferring unit 122 may receive the event notification from the event detection unit 120. Responsive to receiving the event notification, the transferring unit 122 may fetch the generated keyframe (e.g., the keyframe buffer 202) from the keyframe generating unit 118, and then transmit the keyframe buffer 202 to the server 104 for logging. Stated another way, the transferring unit 122 may log the keyframe buffer 202 in the server 104, when the event may be detected by the event detecting unit 120. In this manner, the transferring unit 122 logs the vehicle data in the server 104, when the events are detected in the vehicle 102, so that the server 104 stores vehicle data around all the events happening on/around the vehicle 102, and may not store unnecessary vehicle data (e.g., when no event may be detected in the vehicle 102). As described above, the keyframe buffer 202 comprises the states of all vehicle programs (or node states) and the primary message. Since the keyframe buffer 202 only includes the node states and the primary message, and not the messages published by respective vehicle programs/nodes 204, the keyframe buffer size is small, and hence lesser amount of transmission resources are required by the transferring unit 122 to transmit the keyframe buffer 202 to the server 104.

In some aspects, the transferring unit 122 may be further configured to transmit the additional information to the server 104. As described above, the additional information may be associated with the flow of vehicle data around the vehicle onboard system.

In some aspects, the server 104 may be configured to utilize the stored node states, the primary message, and/or the additional information to reconstruct the vehicle data for one or more keyframes (including the keyframe described above), which may facilitate in investigating or performing diagnostics of the event associated with the vehicle 102 detected by the event detecting unit 120. For example, the server 104 may use the information stored in the keyframe buffer 202 as a starting data before the event, and may plumb back the messages using the recorded additional information, to reconstruct the flow of data across the nodes 204 at the time of the event.

The server 104 may leverage on the aspect that a node, being in the same state as it was on the vehicle 102, consuming the same message at the same time as it did on the vehicle 102, will produce the same outputs that it did on the vehicle 102. Thus, when the server 104 uses the nodes states stored in the keyframe buffer 202 and the primary message (and the additional information), the server 104 may reconstruct the vehicle data, as the nodes 204, in their respective states, are expected to output the same messages every time when the same inputs are fed to them.

For example, as mentioned above, the messages including the first message "$msg_A$", the second message "$msg_B$" etc., are not stored in the keyframe buffer 202, but the node states and the primary message are stored. Thus, the server 104 may reconstruct the "$msg_A$" using the recorded first node state (associated with the first node 204a) and the primary message, as the first node 204a will output the same first message "$msg_A$" when the first node 204a receives the same primary message at the same node state (that is already recorded). After the server 104 reconstructs the first message "$msg_A$", the server 104 may reconstruct the second message "$msg_B$" using the reconstructed first message "$msg_A$" and the second node state associated with the node 204b (that is already recorded), and so on. In this manner, the server 104 may rebuild the entire directed graph using the keyframe buffer 202.

Figure 3:
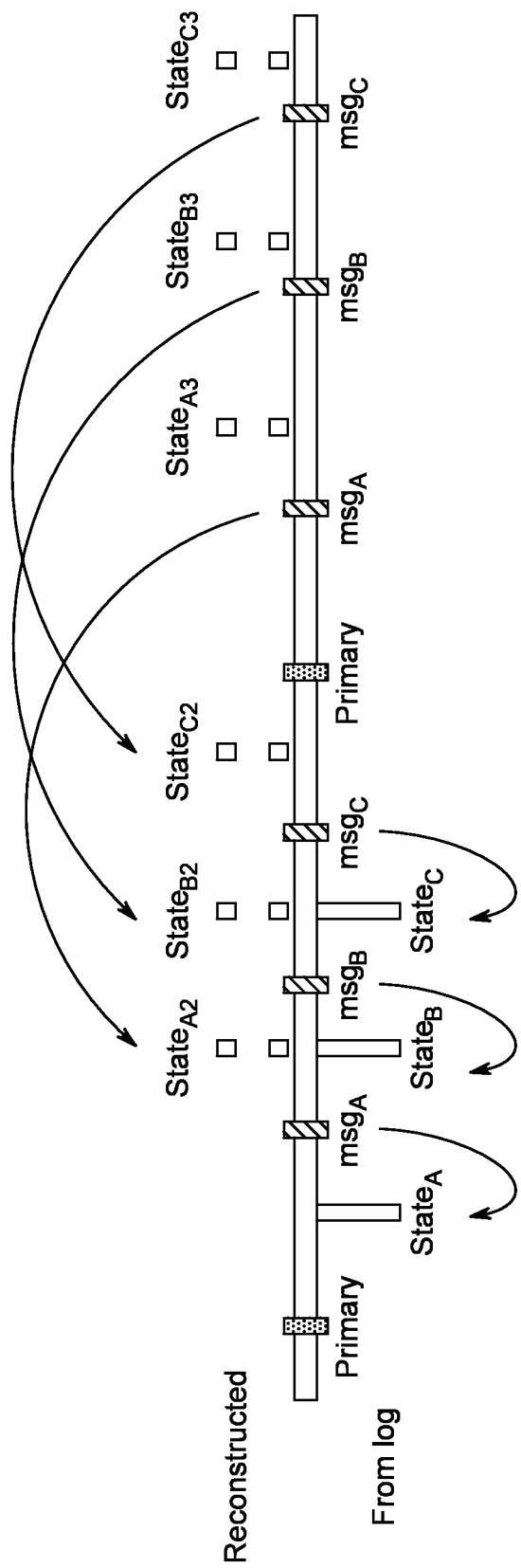
FIG. 3 depicts an example process to reconstruct vehicle data in accordance with the present disclosure.

In additional aspects, the server 104 may reconstruct states between different keyframes, allowing the intermediate data to be reconstructed. In some aspects, the server 104 may store the states of different programs/nodes including $state_A$, $state_B$, $state_C$, and the primary message(s), as shown in FIG. 3. The server 104 may reconstruct other states such as $state_{A2}$, $state_{B2}$, $state_{C2}$, and $state_{A3}$, $state_{B3}$, $state_{C3}$, and the messages $msg_A$, $msg_B$, $msg_C$ based on the stored states, $state_A$, $state_B$, $state_C$, the primary message(s), and the additional information.

For example, to reconstruct the $state_{C3}$, the server 104 may use the $state_{C2}$, and $msg_C$. In case the $state_{C2}$ may not be stored in the keyframe (and hence on the server 104), and the server 104 may reconstruct the $state_{C2}$ using the stored $state_{C1}$ and the $msg_C$. In this manner, the server 104 reconstructs the vehicle data.

Referring back to the data handling system 114, in some aspects, the data handling system 114 (e.g., the keyframe generating unit 118) may first analyze the directed graph before initiating the generation of the keyframe. The keyframe generating unit 118 may identify/check if all the nodes associated with the directed graph may be dependent on the primary message (the keyframe generating unit 118 performed this check because if the nodes 204 do not have dependency on the primary message, the information associated with such nodes 204 may not be reproduced). In a scenario in which all the nodes are not dependent on the primary message, the keyframe generating unit 118 may perform a predetermined action. In some aspects, the predetermined action may include considering a new message (associated with the node that is not dependent on the primary message) as a new primary message and store the new message, so that the new message may be used to reconstruct the vehicle data for such node(s).

In some aspects, the channel associated with the primary message may be referred to as a "primary channel" and the channel(s) associated with the other messages may be referred to as "derived channels". The data handling system 114 (e.g., the keyframe generating unit 118) may store information associated with the primary channel, but may not store information associated with the derived channels. In a scenario in which all the nodes are not dependent on the primary message, the keyframe generating unit 118 may declare one of the channels as the primary channel and store the information associated with the primary channel, which enables the server 104 to reconstruct the vehicle data associated with such nodes. In further aspects, the keyframe generating unit 118 may save one of the messages out as part of a node's state, and then use the message to bootstrap the loop during reconstruction.

Although the present disclosure describes a system and method for logging vehicle data; however, the system and method may also be used for logging any other type of data (not restricted to vehicle data) to minimize utilization of resources. The description of vehicle data should not be construed as limiting the scope of the present disclosure.

The vehicle 102 and the server 104 implement and/or perform operations, as described here in the present disclosure, in accordance with the owner manual and safety guidelines.

Figure 4:
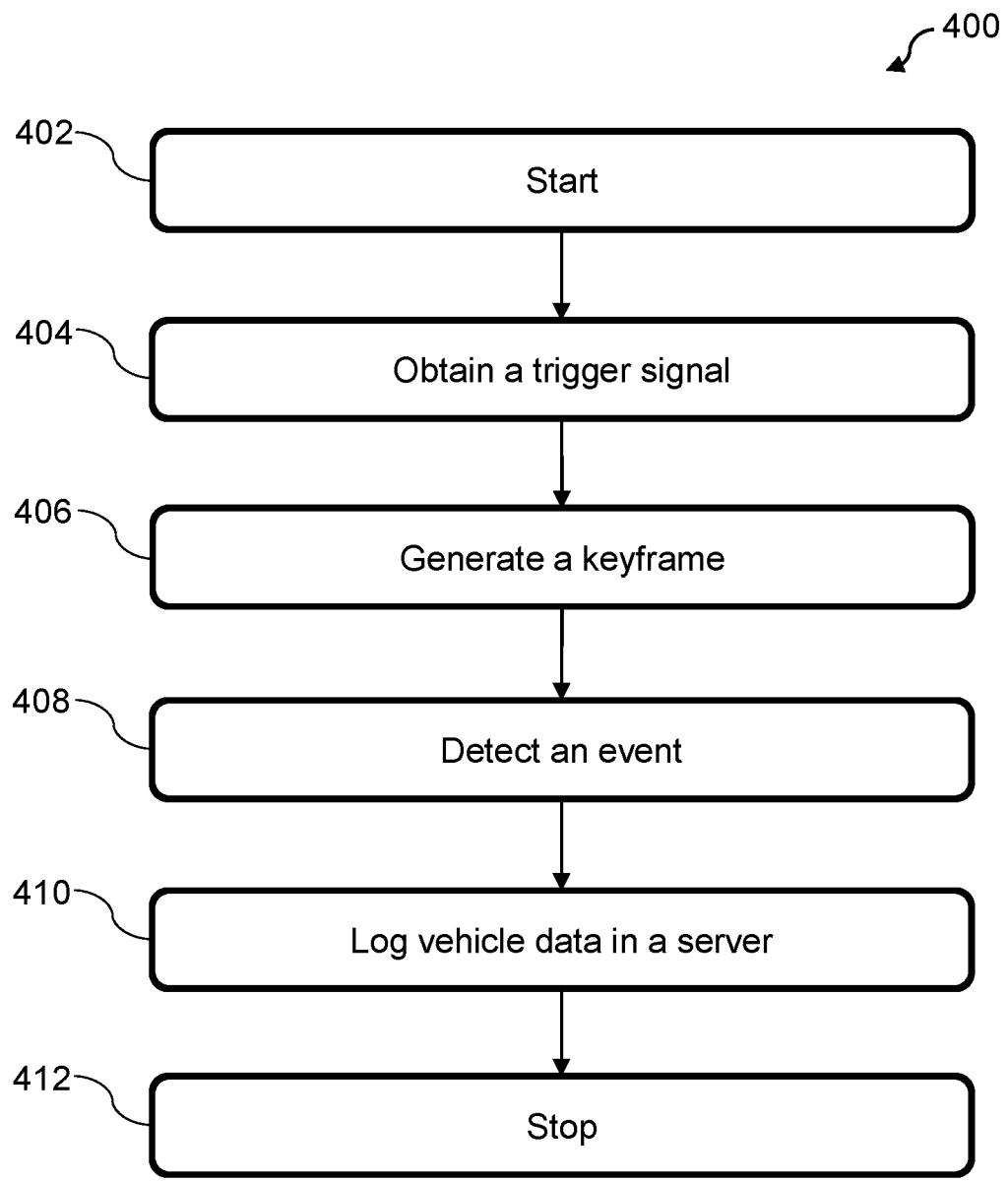
FIG. 4 depicts a flow diagram of an example method for logging vehicle data in accordance with the present disclosure.

FIG. 4 depicts a flow diagram of an example method 400 for logging vehicle data in accordance with the present disclosure. FIG. 4 may be described with continued reference to prior figures. The following process is exemplary and not confined to the steps described hereafter. Moreover, alternative embodiments may include more or less steps than are shown or described herein and may include these steps in a different order than the order described in the following example embodiments.

The method 400 starts at step 402. At step 404, the method 400 may include obtaining, by the data handling system 114, the trigger signal. At step 406, the method 400 may include generating, by the data handling system 114, a keyframe associated with vehicle data responsive to obtaining the trigger signal. The keyframe may include a plurality of node states associated with the plurality of nodes 204. The plurality of nodes 204 may be associated with a plurality of vehicle programs that may be in causal relationship. In some aspects, generating the keyframe may include obtaining and storing a primary message in the keyframe buffer 202, and causing the plurality of vehicle programs to store states of respective node states serially and sequentially in the keyframe buffer 202 to generate the keyframe, responsive to obtaining the primary message. The primary message may be received at the first node 204a of the plurality of nodes 204.

At step 408, the method 400 may include detecting, by the data handling system 114, an event associated with the vehicle. At step 410, the method 400 may include logging, by the data handling system 114, the keyframe buffer 202 in the server 104 responsive to detecting the event. The server 104 may be configured to reconstruct the event information by using the keyframe and the primary message.

At step 412, the method 400 may stop.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims refer to particular system components. As one skilled in the art will appreciate, components may be referred to by different names. This document does not intend to distinguish between components that differ in name, but not function.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Computing devices may include computer-executable instructions, where the instructions may be executable by one or more computing devices such as those listed above and stored on a computer-readable medium.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is That which is claimed is:

1. A method to log data of a vehicle, the method comprising:
   obtaining, by a data handling system, a trigger signal;
   generating, by the data handling system, a keyframe associated with vehicle data responsive to obtaining the trigger signal, wherein the keyframe comprises a plurality of node states associated with a plurality of nodes, wherein the plurality of nodes is associated with a plurality of vehicle programs that are in causal relationship, and wherein generating the keyframe comprises:
      obtaining and storing a primary message in a keyframe buffer, wherein the primary message is received at a first node of the plurality of nodes; and
      causing the plurality of vehicle programs to store states of respective node states serially and sequentially in the keyframe buffer to generate the keyframe, responsive to obtaining the primary message;
   detecting, by the data handling system, an event associated with the vehicle; and
   logging, by the data handling system, the keyframe buffer in a server responsive to detecting the event, wherein the server is configured to reconstruct event information by using the keyframe and the primary message.

2. The method of claim 1, wherein generating the keyframe further comprises causing a first vehicle program, of the plurality of vehicle programs, to store a first node state, of the plurality of node states, in the keyframe buffer when the first node receives the primary message.

3. The method of claim 2, wherein the first node state is based on the primary message.

4. The method of claim 2 further comprising causing the first vehicle program to publish a first message, when the first node receives the primary message, wherein the first message is configured to propagate from the first node to a second node of the plurality of nodes.

5. The method of claim 4, wherein the first message is based on the first node state and the primary message.

6. The method of claim 4 further comprising causing a second vehicle program, of the plurality of vehicle programs, to store a second node state, of the plurality of node states, in the keyframe buffer when the second node receives the first message.

7. The method of claim 6 further comprising causing the second vehicle program to publish a second message, when the second node receives the first message, wherein the second message is configured to propagate from the second node to a third node of the plurality of nodes.

8. The method of claim 7, wherein the second message is based on the second node state and the first message.

9. The method of claim 7, wherein the first message and the second message are not stored in the keyframe buffer.

10. The method of claim 1 further comprising:
    obtaining additional information, wherein the additional information comprises information associated with a flow of data around a vehicle onboard system; and
    storing the additional information in the keyframe buffer.

11. The method of claim 1 further comprising:
    monitoring vehicle information; and
    detecting the event based on monitoring the vehicle information.

12. The method of claim 11, wherein the vehicle information is associated with inputs provided by a plurality of sensors associated with the vehicle.

13. A system comprising:
    a keyframe generating unit configured to:
       obtain a trigger signal; and
       generate a keyframe associated with vehicle data, associated with a vehicle, responsive to obtaining the trigger signal, wherein the keyframe comprises a plurality of node states associated with a plurality of nodes, wherein the plurality of nodes is associated with a plurality of vehicle programs that are in causal relationship, and wherein to generate the keyframe, the keyframe generating unit is configured to:
          obtain and store a primary message in a keyframe buffer, wherein the primary message is received at a first node of the plurality of nodes; and
          cause the plurality of vehicle programs to store states of respective node states serially and sequentially in the keyframe buffer to generate the keyframe, responsive to obtaining the primary message;
    an event detecting unit configured to detect an event associated with the vehicle; and
    a transferring unit configured to log the keyframe buffer in a server responsive to detecting the event, wherein the server is configured to reconstruct event information by using the keyframe and the primary message.

14. The system of claim 13, wherein the keyframe generating unit is further configured to cause a first vehicle program, of the plurality of vehicle programs, to store a first node state, of the plurality of node states, in the keyframe buffer when the first node receives the primary message.

15. The system of claim 14, wherein the first node state is based on the primary message.

16. The system of claim 14, wherein the keyframe generating unit is further configured to cause the first vehicle program to publish a first message, when the first node receives the primary message, wherein the first message is configured to propagate from the first node to a second node of the plurality of nodes.

17. The system of claim 16, wherein the first message is based on the first node state and the primary message.

18. The system of claim 16, wherein the keyframe generating unit is further configured to cause a second vehicle program, of the plurality of vehicle programs, to store a second node state, of the plurality of node states, in the keyframe buffer when the second node receives the first message.

19. The system of claim 18, wherein the keyframe generating unit is further configured to cause the second vehicle program to publish a second message, when the second node receives the first message, wherein the second message is configured to propagate from the second node to a third node of the plurality of nodes, and wherein the second message is based on the second node state and the first message.

20. A non-transitory computer-readable storage medium having instructions stored thereupon which, when executed by a processor, cause the processor to:
    obtain a trigger signal;
    generate a keyframe associated with vehicle data, associated with a vehicle, responsive to obtaining the trigger signal, wherein the keyframe comprises a plurality of node states associated with a plurality of nodes, wherein the plurality of nodes is associated with a plurality of vehicle programs that are in causal relationship, and wherein the generation of the keyframe comprises:

obtaining and storing a primary message in a keyframe buffer, wherein the primary message is received at a first node of the plurality of nodes; and causing the plurality of vehicle programs to store states of respective node states serially and sequentially in the keyframe buffer to generate the keyframe, responsive to obtaining the primary message;

detect an event associated with the vehicle; and log the keyframe buffer in a server responsive to detecting the event, wherein the server is configured to reconstruct event information by using the keyframe and the primary message.

* * * * *